Patented May 30, 1950

2,509,408

UNITED STATES PATENT OFFICE 2,509,408

METHOD OF PROCESSING DIFFUSION JUICE

Paul W. Alston, Berkeley, Carl J. Moroney, San Mateo, and Wharton K. Gray, San Francisco, Calif., assignors to Spreckels Sugar Company, San Francisco, Calif., a corporation of California No Drawing. Application December 11, 1945, Serial No. 634,413

9 Claims. (Cl. 127—46)

Our invention relates to the manufacture of beet sugar; and the principal object of the invention is the provision of a method of treating raw diffusion juice, by which the juice may be stored without spoilage or serious loss of sugar.

The invention possesses other valuable features, some of which with the foregoing will be set forth at length in the following description of our preferred method. It is to be understood however that our invention as recited in the claims may be variously embodied in a plurality of methods.

In the production of sugar from sugar beets, the seasonal operation of the factory is usually limited to the duration of the harvest season, plus the few additional weeks in which climatic conditions permit storage of harvested beets without material deterioration until they can be processed.

The operating time of the factory is usually only from 60 to 120 days out of the year; and even for this limited time, the acreage for growing the beets must be large enough to enable efficient operation, and close enough to the factory to permit economical transportation of the harvested beets.

Attempts have been made to spread the time of factory operation over a longer portion of the year by cold storage of the beets, and by dehyration of the sliced beets or cossettes; and by such methods, make economically possible the use of smaller and more distant areas. Some success has been achieved but such methods have not been sufficiently economical to be used extensively.

In the conventional method of sugar manufacture from sugar beets, the raw juice from the diffusion battery contains from 10% to 15% solids. This raw juice is treated with lime, either with or without predefecation, and carbon dioxide, and then filtered. The filtrate is re-treated with carbon dioxide and filtered; and this second filtrate is usually treated with sulphur dioxide, filtered, and then concentrated by evaporation to a density of 60% to 65% solids.

We have discovered that the raw diffusion juice can be concentrated and held in storage under readily attained temperature control without serious depreciation of quality; and that the concentrate can then be processed at a later time with the usual equipment of a beet sugar factory to produce a satisfactory yield and quality of refined sugar. No serious loss of sugar results during concentrating if the retention time of the juice in the evaporator is limited to a few minutes. This has been successfully accomplished by using a long tube climbing film type evaporator with or without some measure of recirculation within any one effect.

Using high speed evaporators of the type referred to, the raw juice, according to our invention, is evaporated to a concentration of 65° to 75° Brix, and delivered to storage tanks. The temperature of the concentrated juice in storage must be kept below 25° C., to prevent deterioration and loss of sugar. No lime is usually required before concentration, but since the pH value during the storage of the concentrate should be kept in the range near neutrality, some raw juices may require the addition of lime or other reagent before, or after concentration to provide the proper pH value during the storage.

When the stored concentrated juice is to be processed for the extraction of sugar it is withdrawn and diluted to about 25° to 35° Brix and then limed and carbonated in the usual manner, with or without predefecation, using either milk of lime or saccharate milk. The carbonated raw juice may then be processed according to the commonly followed procedure, or may be filtered directly on rotary vacuum filters without the intermediate use of a thickening filter or gravity sedimentation clarifier.

Since the concentration of the raw juice removes a large percentage of the water, the lime used will be in greater concentration. If a 15° Brix raw juice were concentrated to 30° Brix, more than half of the water would be removed; and therefore, if the equivalent 2.5% lime on beets were used, the concentration of the lime would be doubled; and the effect would be equivalent to increasing the percentage of lime used. The results of this increase in lime concentration would be to decrease the amount of lime required for the usual carbonation.

The advantages of diluting the concentrated juice to about 25° to 35° Brix by treating in the carbonation stations are: The heater and evaporator heating surfaces remain clean for longer periods; a more highly purified juice is obtained because of higher juice concentration; less lime is required; the intermediate thickening filter or gravity sedimentation clarifier may be eliminated; smaller units may be required in the carbonation station and elsewhere because of the small volume of juice to be handled. This will result in lowered cost for equipment.

No additional evaporator equipment is required other than pumps. The concentration of the raw juice may be effected in the early effect of the evaporator; and the purified concentrate further evaporated in the latter effects.

Concentrating raw diffusion juice without treatment other than the addition of a small amount of lime or other reagent to control the pH offers a means of safely storing the available sugar in sugar beets. This will allow a factory to operate more days each year than is now possible with beet storage alone. It will make it economical to grow beets in areas too small to maintain a factory and too far removed to allow economical transportation of beets to existing factories.

Even when the element of storage of juice is not a factor, concentration of the juice before other treatment has distinct advantages. Concentration of the raw diffusion juice in a conventional factory before purification by the carbonation systems affords a better purification, and reduces the incrustation in the evaporator. It also reduces the amount of lime required.

We claim:

1. The method of preserving the sugar in raw diffusion beet juice during a period of delay prior to processing the juice which comprises rapidly concentrating the raw juice in a few minutes to about 65° to 75° Brix, the concentrate having a pH value in the range near neutrality, and storing the concentrate at a temperature below 25° C.

2. The method of manufacturing sugar from raw diffusion beet juice which comprises rapidly concentrating the raw juice in a few minutes to about 65° to 75° Brix, the concentrate having a pH value in the range near neutrality, storing the concentrate at a temperature below 25° C., diluting the concentrate, and processing the dilute concentrate to recover the sugar.

3. The method of manufacturing sugar from raw diffusion beet juice which comprises rapidly concentrating the raw juice in a few minutes to about 65° to 75° Brix, the concentrate having a pH value in the range near neutrality, storing the concentrate at a temperature below 25° C., diluting the concentrate to about 25° to 35° Brix, and processing the dilute concentrate to recover the sugar.

4. The method of manufacturing sugar from raw diffusion beet juice which comprises rapidly concentrating the raw juice in a few minutes to about 65° to 75° Brix, adding lime to adjust the pH of the concentrate to a value in the range near neutrality, storing the concentrate at a temperature below 25° C., diluting the concentrate to about 25° to 35° Brix, and processing the dilute concentrate to recover the sugar.

5. The method of manufacturing sugar from raw diffusion beet juice which comprises rapidly concentrating the raw juice in a few minutes to about 65° to 75° Brix, adjusting the pH of the concentrate to a value in the range near neutrality, storing the concentrate at a temperature below 25° C., diluting the concentrate to about 25° to 35° Brix, and processing the dilute concentrate to recover the sugar.

6. In a method of manufacturing sugar from raw diffusion beet juice, the steps comprising rapidly concentrating the raw juice in a few minutes to about 65° to 75° Brix, adding a reagent to the juice to adjust the pH of the concentrate to a value in the range near neutrality, then cooling the concentrate to a temperature below 25° C., thereafter diluting the concentrate to about 25° to 35° Brix, then liming, carbonating and filtering the dilute concentrate.

7. In a method of manufacturing sugar from raw diffusion beet juice, the steps comprising rapidly concentrating the raw juice in a few minutes to about 65° to 75° Brix, the concentrate having a pH value in the range near neutrality, then cooling the concentrate to a temperature below 25° C., thereafter diluting the concentrate to about 25° to 35° Brix, then liming, carbonating and filtering the dilute concentrate.

8. In a method of manufacturing sugar from raw diffusion beet juice, the steps comprising rapidly concentrating the raw juice in a few minutes to about 65° to 75° Brix, the concentrate having a pH value in the range near neutrality, then cooling the concentrate to a temperature below 25° C., and thereafter diluting the concentrate to about 25° to 35° Brix.

9. In a method of manufacturing sugar from raw diffusion beet juice, the steps comprising rapidly concentrating the raw juice in a few minutes to about 65° to 75° Brix, adding a reagent to the juice to adjust the pH of the concentrate to a value in the range near neutrality, then cooling the concentrate to a temperature below 25° C.

PAUL W. ALSTON.
CARL J. MORONEY.
WHARTON K. GRAY.

REFERENCES CITED

The following references are of record in the file of this patent:

UNITED STATES PATENTS

| Number | Name | Date |
| --- | --- | --- |
| Re. 1,830 | Riggs | Nov. 29, 1861 |
| 198,943 | Jasper | Jan. 9, 1878 |
| 669,659 | Peterson | Mar. 19, 1901 |
| 1,104,095 | Bach | July 21, 1914 |
| 1,668,470 | Schmid | May 1, 1928 |

FOREIGN PATENTS

| Number | Country | Date |
| --- | --- | --- |
| 39,465 | Netherlands | Oct. 16, 1936 |

OTHER REFERENCES

Fairrie, Sugar, 1st ed., Liverpool, 1925, page 33.
Deerr, Cane Sugar, London, 1921, page 269.
Heriot, Mfg. of Sugar from the Cane and Beet, London, 1920, pages 175 and 176.